United States Patent [19]
Harben, Jr. et al.

[11] 3,767,044
[45] Oct. 23, 1973

[54] PHOTOELECTRIC SIZING APPARATUS AND METHOD

[75] Inventors: Grover S. Harben, Jr., Gainesville; Ernest E. Lewis, Flowery Branch; Lloyd E. Sloan, Gainesville, all of Ga.; William J. Lawson, Milton, Del.

[73] Assignee: Gainesville Machine Company, Inc., Gainesville, Ga.

[22] Filed: May 10, 1971

[21] Appl. No.: 141,471

[52] U.S. Cl. .............................................. 209/121
[51] Int. Cl. ............................................ B07b 13/08
[58] Field of Search .................. 209/121, 74; 177/1

[56] References Cited
UNITED STATES PATENTS

| | | | |
|---|---|---|---|
| 2,702,120 | 2/1955 | Nordquist | 209/121 |
| 3,135,386 | 6/1964 | Reading | 209/121 |
| 3,276,525 | 10/1966 | Cass | 177/1 |
| 3,596,749 | 8/1971 | Altenpohl, Jr. | 209/121 |
| 3,622,000 | 11/1971 | McClenny | 209/121 |

Primary Examiner—Allen N. Knowles
Attorney—B. J. Powell

[57] ABSTRACT

A poultry sizing apparatus and method wherein the apparatus includes a weighted scale beam pivotally mounted onto which the weight of poultry is successively subjected while being conveyed thereby to pivot the beam. A photoelectric sensing device is positioned adjacent the extending end of the beam and a slotted scan plate is mounted on the beam to selectively time the movement of the beam between two predetermined points. If the time required for the beam to travel between the points is greater than a preselected amount, the photoelectric sensing device causes an ejector mechanism to eject the poultry from the conveying means.

10 Claims, 6 Drawing Figures

INVENTORS
GROVER S. HARBEN, JR.
ERNEST E. LEWIS
LLOYD E. SLOAN
WILLIAM J. LAWSON
BY: B. Powell
ATTORNEY

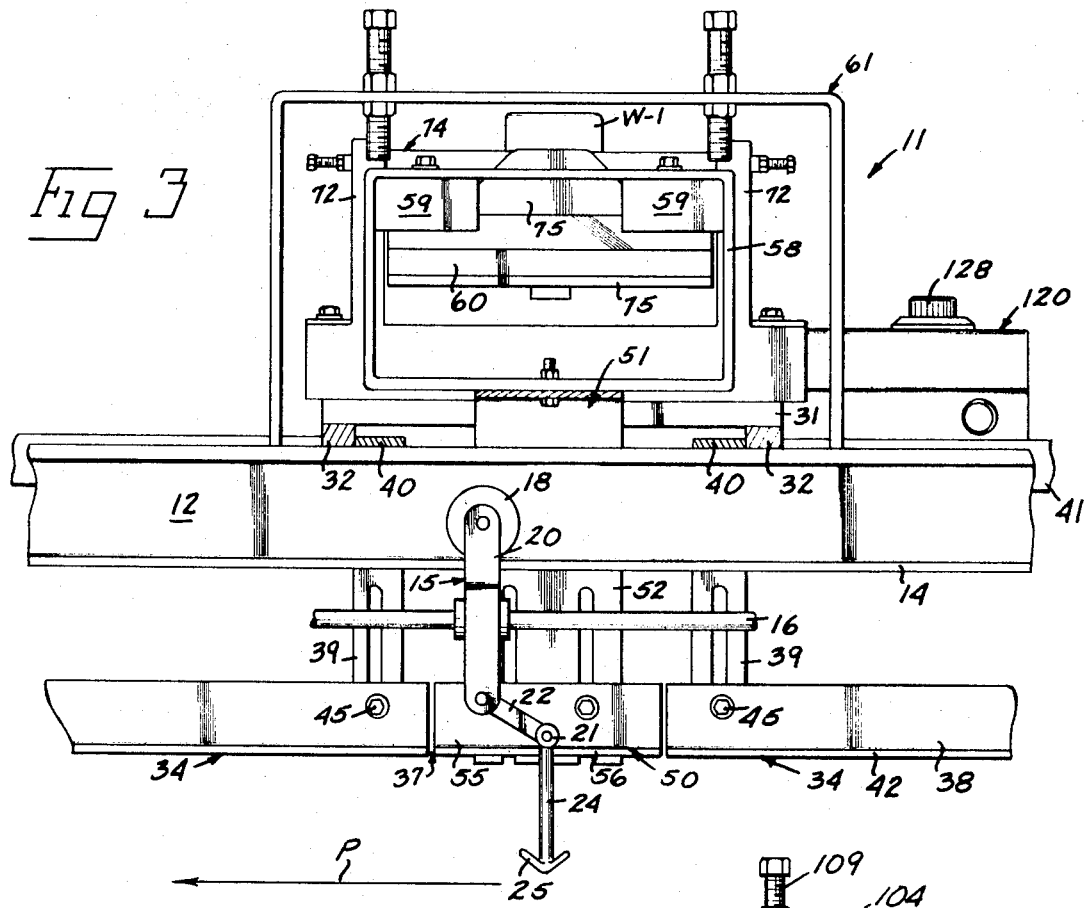
Fig 3
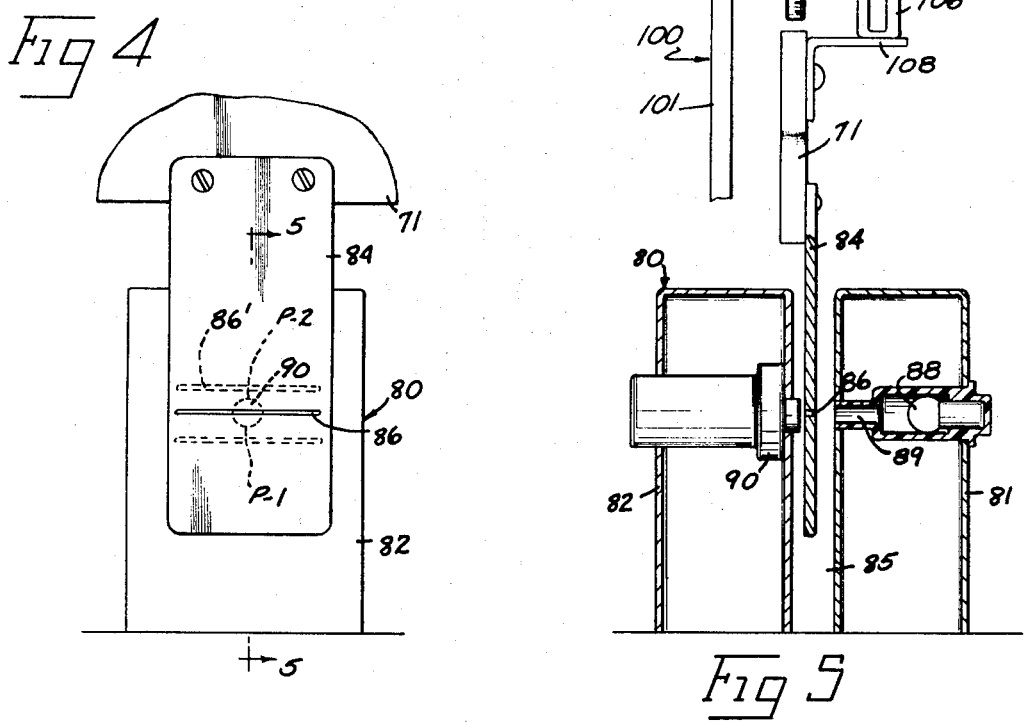
Fig 4
Fig 5

3,767,044

PHOTOELECTRIC SIZING APPARATUS AND METHOD

The method of the invention includes the steps of successively subjecting the weight of poultry onto a pivoted scale beam to pivot same, timing the movement of the beam between two points, and ejecting the poultry if the time of movement of the beam is greater than a preselected amount.

BACKGROUND OF THE INVENTION

Because poultry is sized according to weight, various devices have been devised to mechanically separate poultry according to the above requirements. These sizing devices are usually arranged in a series of stations by which the poultry is conveyed. Each station weighs the bird and ejects same if the bird exceeds a prescribed weight. Because each station could eject only above a prescribed weight range, these stations had to be ordered so that the heaviest birds were ejected first and the lightest birds last. Moreover, because the sizing range for each grade or size of bird includes several weights, it was difficult to insure that all birds within the particular sizing range would be ejected at each station. Most of these prior art poultry sizers have used micro-switches to actuate the ejector mechanism upon contact by the pivoted weighing beam. This has required the weights on the beam as well as the micro-switches themselves to be very accurately located in order to propery weigh the birds, this adjustment being very time consuming. Also, the humid environment of the processing plant frequently corrodes the contacts of the micro-switches rendering them inoperative.

SUMMARY OF THE INVENTION

These and other problems and disadvantages associated with the prior art are overcome by the invention disclosed herein by providing a weight sensing mechanism which is adjustable to eject poultry from a conveyor within a prescribed weight range without ejecting poultry outside the weight range. The mechanism is easily adjustable to vary the ejected weight range and includes no switch contacts subject to corrosion with the accompanying malfunction. The invention determines the weight of the poultry by timing the movement of the scale beam between two points and selectively ejecting the poutry in accordance with this determination. Thus, the necessity of ordering the weighing or sizing stations is eliminated.

The apparatus of the invention includes the conventional conveyor for transporting the birds, a pivoted scale beam mounting a weighing platform and engaged by the poultry and conveyor to weigh same, and an ejector mechanism for selectively ejecting the poultry from the conveyor. A slotted plate is mounted on the free end of the scale beam and swingable between a light source and a photocell to activate a control circuit for ejecting the poultry. The control circuit includes a delay means for preventing the activation of the ejector mechanism for a selectible predetermined period of time so that if the poultry is not within the prescribed weight range, the slotted plate will block the light to the photoelectric cell to prevent activation of the ejector mechanism.

The method of the invention includes timing the movement of the scale beam between two points in response to the weight of poultry and ejecting the poultry if the time of movement of the beam is within a predetermined range.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 3 is a cross-sectional view taken along line 3—3 in FIG. 2;

FIG. 4 is an enlarged view showing the slotted scan plate;

FIG. 5 is a cross-sectional view taken along line 5—5 in FIG. 4; and,

These figures and the following detailed description disclose specific embodiments of the invention, however, it is to be understood that the invention concept is not limited thereto since it may be embodied in other forms.

DETAILED DESCRIPTION OF ILLUSTRATIVE EMBODIMENTS

Referring to the figures, the invention is illustrated in a poultry sizer having a conveyor 10 for transporting the poultry along a prescribed path P and a plurality of weighing or sizing stations 11 arranged along the conveyor 10 adjacent path P. Each weighing station 11 includes an ejector mechanism 13 for discharging the birds from the conveyor 10 when the bird is within a prescribed weight range. While only two stations are illustrated, it is to be understood that as many weighing stations as desired may be used without departing from the scope of the inventive concept.

Figure 1:
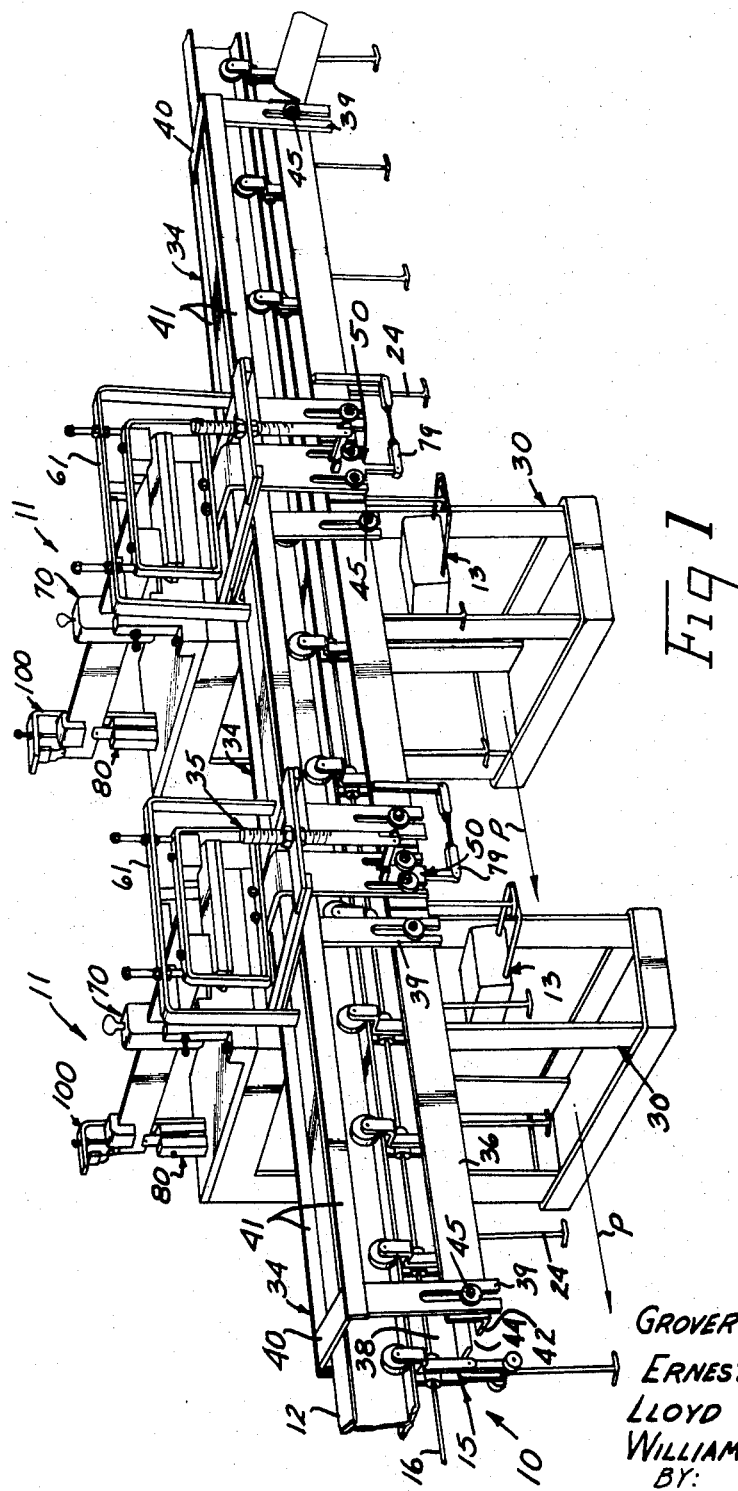
FIG. 1 is a perspective view showing a plurality of weighing or sizing stations embodying the invention.
Figure 2:
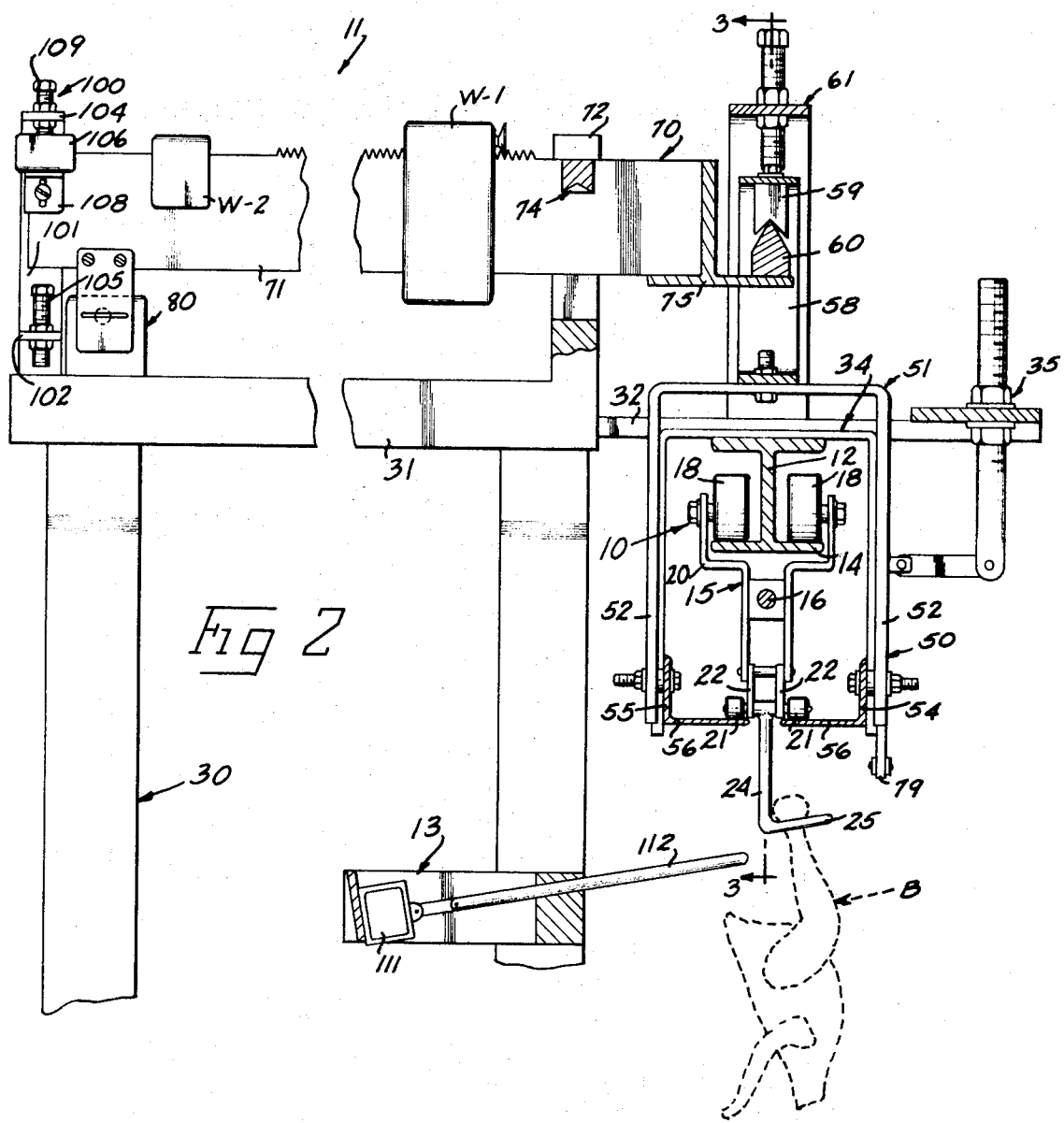
FIG. 2 is a transverse cross-sectional view taken through one of the weighing or sizing stations.

Referring more particularly to FIGS. 1–3, the conveyor 10 includes an I-shaped carrier rail 12 from the lower flange 14 of which are suspended a plurality of carrier members 15 which support and successively move the poultry along the path P through a conventional drive system such as the cable drive 16 illustrated.

Each carrier member 15 includes a trolley assembly having a pair of trolley wheels 18 which engage flange 14 of rail 12 to support the assembly through yoke 20 rotatably connected to the wheels 18. The drive 16 is attached to the yoke for moving the trolley assembly and a pair of weighing wheels 21 are rotatably carried by the extending ends of links 22 pivoted to the lower end of yoke 20. A hanger or shackle member 24 is pivotally carried by the extending ends of links 22 and wheels 21 to supporting a bird B (see FIG. 2) by its hock through a bifurcated finger member 25 on shackle member 24. The finger member 25 is angled up from the horizontal at a slight angle toward the extending ends thereof so that gravity serves to retain the hock of the bird therein.

Since both weighing stations 11 have the same construction, only one station will be shown in detail in FIGS. 2 and 3 for sake of simplicity. The station 11 includes a support stand 30 which carries the station and also helps support conveyor 10. A support platform 31 is mounted on support stand 30 and includes a pair of support arms 32 which extend forwardly of the platform 31 over and support rail 12. The arms 32 also mount a secondary guide assembly 34 as seen in FIGS. 1 and 3 and a lateral displacement check assembly 35 as seen in FIGS. 1 and 2.

The secondary rail assembly 34 includes L-shaped guide angles 36 and 38 disposed below rail 12 on the depending legs 39 of inverted U-shaped brackets 40 as best seen in FIGS. 1 and 3. The brackets 40 are carried by side members 41 mounted on opposite sides of the rail 12 by arms 32. The brackets 40 span rail 12 with the legs 39 thereof depending on opposite sides of the rail 12 so that the carriage members 15 can pass along rail 12 without interference of the brackets 40. The guide angles 36 and 38 are mirror images of each other with one guide angle 36 and one guide angle 38 being located on opposite sides of each station 11 so as to define an opening 37 between the adjacent ends of angles 36 and angles 38. The support leg 42 of each angle 36 and 38 extends out under rail 12 to support the weighing wheels 21 on the upper surface thereof so that the links 22 are pivoted up to a position such that the weight of bird B is carried by wheels 21 resting on legs 42. A passage 44 is defined between legs 42 of opposed angle 36 and angle 38 for the passage of the depending shackle members 24. The legs 39 of brackets 40 are provided with adjusting means 45 for selectively varying the vertical height of angles 36 and 38.

A weighing platform assembly 50 is positioned over the rail 12 at station 11 and extends into the opening 37 between angles 36 and angles 38. The assembly 50 includes an inverted U-shaped carriage 51 which extends over and above rail 12. Carriage 51 includes a pair of depending legs 52 which extend below rail 12 on opposite sides thereof and carry sub-angles 54 and 55 at the lower ends thereof. Sub-angle 54 corrsponds to angle 36 while angle 55 corresponds to angle 38 and are carried by legs 52 so that the support legs 56 thereof can be aligned with and form continuations of legs 42 of angles 36 and 38 and support weighing wheels 21 of the carrier members 15.

The inverted U-shaped carriage 51 depends from the lower run of an annular connector 58 with a square configuration. A pair of knife edge saddles 59 depend from the lower side of the upper run of connector 58 to be engaged by and supported on a knife edge member 60 carried by the scale beam assembly 70 as will be explained. A retainer 61 may be provided for preventing the inadvertent separation of the knife edge member 60 and saddles 59 as is conventional.

The scale beam assembly 70 includes a thin rectangular scale beam 71 pivotally carried by a pair upstanding posts 72 through a conventional knife edge connection 74. The forward end of the beam 71 facing the weighing platform assembly 50 carries a transverse abutment 75 which mounts the knife edge member 60 on the outer edge thereof. Therefore, it will be seen that the support legs 56 on sub-angles 54 and 55 are vertically positioned by scale beam 71 and are effective to pivot scale beam 71 in response to the weight of weighing wheels 21 on legs 56 in conventional manner.

Weights W-1 and W-2 are adjustably carried by scale beam 71 in conventional manner to determine the weight required to be imposed on legs 56 of sub-angles 54 and 55 before the beam 71 is pivoted counterclockwise as seen in FIG. 2.

The lateral displacement check assembly 35 mounted on arms 32 in conjunction with the longitudinal check assembly 79 serves to maintain the movement of the weighing platform assembly 50 along a substantially vertical path as is conventional in the art.

The construction of the device up to this point is conventional. For actuating the ejector mechanism 13 in response to the movement of the rearwardly extending end of scale beam 71, an actuating mechanism 80 is provided as best seen in FIGS. 2, 4 and 5. The mechanism 80 includes generally a light source 81 and photoelectric receiving head 82 carried by the platform 31 and a scan plate 84 carried by the scale beam 71. The light source 81 and receiving head 82 are positioned close together so as to define a relatively narrow space 85 therebetween. The scan plate 84 selectively extends into the space to block the light received by head 82 as will be explained.

Referring particularly to FIGS. 4 and 5, the scan plate 84 is a thin rectangular member secured to the lower edge of beam 71. A narrow light admittance slot 86 is defined therethrough along its central portion and substantially parallel to the lower edge of beam 71. This slot 86 remains substantially horizontal during its movement between source 81 and head 82. The light source 81 includes a conventional light bulb 88 with a passage 89 which directs the light beams into space 85. The receiving head 82 includes a photo diode 90 located across the space 85 diametrically opposite the bulb 88 so that the plate 84 will preclude the exposure of the photo diode 90 to the light beams but the slot 86 will allow the light beams to energize the photo diode 90 as will be explained. The diameter d of the responsive surface of photo diode 90 is shown in FIG. 4 and the plate 84 is located closely adjacent the photocell.

A stop assembly 100 is provided at the rearmost end of scale beam 71 for adjustably limiting the movement of the beam. The assembly 100 includes an upright standard 101 with a lower support bracket 102 and an upper stop bracket 104 as best seen in FIG. 2. Lower bracket 102 carries a threaded stop member 105 which contacts the lower edge of beam 71 to limit its downward pivotal movement in a counterclockwise direction as seen in FIG. 2. The member 105 threadedly engages the bracket 102 for allowing selected adjustment of the lower limit of travel of beam 71. This member is adjusted so that the legs 56 of sub-angles 54 and 55 are substantially aligned with the legs 42 of angles 36 and 38 as is conventional. Upper stop bracket 104 also carries a threaded stop member 109 which contacts the upper edge of beam 71 to limit its upward pivotal movement in a clockwise direction as seen in FIG. 2.

The lower stop member 105 is also adjusted so that the slot 86 is below the light responsive surface of the photo diode 90 and plate 84 is blocking the light beams to prevent the energization of the photo diode. The upper stop member 109 is adjusted so that the upward movement of the beam 71 is arrested after slot 86 has crossed the light responsive surface of photo diode 90 to the position shown by dashed lines at 86' and plate 84 is again preventing the light beams from activating the photo diode 90.

A magnet 106 is adjustably mounted adjacent the upper edge of beam 71 in the vicinity of stop bracket 104 as best seen in FIGS. 2 and 5 by brace 108. Magnet 106 is adjusted by moving brace 108 until the upper edge of magnet 106 is in the vicinity of stop bracket 104 but a small air gap 107 is left therebetween when the beam 71 engages the upper stop member 109. The magnet 106 has sufficient magnetic strength to maintain the beam 71 in its upper position as long as the weight of the poultry is carried on the weighing platform assembly 50 but insufficient to hold the beam 71 in its upper position after the weight of the poultry has moved off platform assembly 50. This prevents bouncing of the beam after it contacts member 109 but allows the beam to return to its lower position once the weight of the poultry is removed therefrom.

A conventional ejector mechanism 13 is carried by support stand 30 below platform 31 and positioned so that its solenoid 111 will drive ejection arm 112 outwardly to engage the leg of the bird B and eject it from the shackle member 24 when actuated in conventional manner by station 11 as will be explained.

ELECTRICAL CIRCUIT

Figure 6:
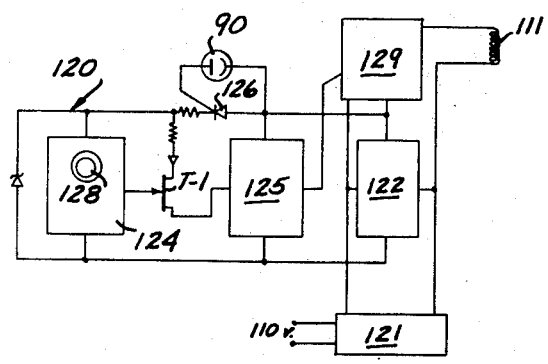
FIG. 6 is an electrical block diagram drawing for the invention.

Referring to the schematic of FIG. 6 the electrical circuit 120 is connected between the photo diode 90 and the solenoid 111 to actuate same in response to the light beams striking the photo diode 90 as the slot 86 passes over the face of the diode 90.

The circuit 120 includes a power supply 121 for supplying 24 volts from a 110 volt circuit. The power supply is connected to a rectifier 122 which is in turn connected in parallel to a variable RC circuit 124 and a holding circuit 125 in series with a silicon controlled rectifier 126. The output from the RC circuit 124 is selectively varied by a micro potentiometer 128 and is connected to the gate of unijunction transistor T-1. The input of the transistor T-1 is connected in the series circuit of the rectifier 122 and the output therefrom is connected to the holding circuit 125 to actuate same. The output from the holding circuit 125 is connected to an actuating circuit 129 connecting the solenoid 111 to power supply 121.

The photo diode 90 is connected to the silicon controlled rectifier 126 so as to cause the rectifier to conduct when the light beams strike photo diode 90. When the silicon controlled rectifier 126 is conducting, a voltage is applied to the variable RC circuit 124. When the voltage is applied to the RC circuit, the circuit is charged until the voltage output at the gate of transistor T-1 reaches firing potential whereupon the transistor conducts to actuate holding circuit 125. The charging time of the RC circuit 124 to reach the firing potential of transistor T-1 can be selectively varied by varying the setting of the micro potentiometer 128. This serves to delay the time between which the RC circuit 124 has a voltage applied thereto and the transistor T-1 conducts as will be explained. When the transistor T-1 conducts to actuate the holding circuit 125, the actuating circuit 129 will be activated for a sufficient length of time to fully operate solenoid 111 and eject the bird B from shackle member 24.

OPERATION

From the foregoing, it will be seen that the birds B are suspended from the shackle members 24 of the carrier members 15 and the carrier members 15 are moved along rail 12 in conventional manner by cable drive 16. The weighing wheels 21 are supported by the support legs 42 of the angles 36 and 38 between stations 11 and by the legs 56 of sub-angles 54 and 55 at each station 11 so that the weight of bird B is carried by these legs.

The weights W-1 and W-2 are adjusted on scale beam 71 so that the desired predetermined minimum weight of the bird B is required to pivot the scale beam 71 when the weight of the bird is imposed on the weighing platform assembly 50 as is conventionally done. Thus, when a bird is below the minimum weight registerable by pivoting the beam 71, it will pass over the platform assembly 50 without moving beam 71 to activate the ejector mechanism 13 and continue along rail 12.

When the weight of bird B is sufficient to pivot beam 71 when it is imposed on platform assembly 50, the time of movement of the free end of beam 71 between two predetermined points is directly proportional to the weight of the bird. Thus, by timing the movement of the beam between two points, it can easily be determined whether the bird is within the prescribed weight range.

Since the diameter of the face of the photo diode 90 is fixed with the first point P-1 at the lowermost portion of the diode 90 and the second point P-2 at the uppermost portion of the diode 90 as seen in FIG. 4. The slot 86 will uncover portions of the face of diode 90 to allow it to conduct and supply voltage to the RC circuit 124 as the scan plate 84 moves with the beam 71. Thus, the photo diode conducts only while slot 86 moves between points P-1 and P-2 to allow circuit 124 to charge and fire transistor T-1.

The micro potentiometer 128 is used to adjust the charging time of the RC circuit 124 such that the transistor T-1 will be fired just before the maximum weight of a bird within the prescribed weight range will move the beam 71 and slot 86 past point P-2 and block photo diode 90. Thus, if the weight of the bird B is greater than the maximum allowable weight in the desired weight range, the beam 71 will be pivoted sufficiently fast to cause the slot 86 to pass point P-2 before the transistor T-1 is fired. This causes the photo diode 90 to be blocked by scan plate 84 to prevent diode 90 from conducting and deactivate the RC circuit 124. Since the circuit 124 is deactivated, the transistor T-1 will not be fired and the ejector mechanism 13 will not be activated to eject the bird B. Thus, the bird will be allowed to continue past station 11.

The micro potentiometer 90 may be calibrated so that the operator can easily adjust the weight range by adjusting the dial of the potentiometer. Moreover, the stations 11 may be arranged in any desired order thus allowing additional weighing or sizing stations 11 to be quickly and easily added to a poultry sizing line.

While specific embodiments of the invention has been disclosed herein, it is to be understood that full use of modifications, substitutions and equivalents may be made without departing from the scope of the invention.

What is claimed as invention is:

1. A method of sizing poultry on a sizing device having a conveyor means for successively conveying poultry along a prescribed path, a weighted member pivotally mounted adjacent the path, and a platform member carried by the weighted member to which the weight of the poultry is subjected to pivot the weighted member in response to the weight of the poultry including the steps of:

subjecting the weight of each bird on the platform member to pivot the weighted member;

timing the movement of the weighted member between two points a prescribed distance apart; and, ejecting the bird from the conveyor means if the time of movement of the weighted member between said points is greater than a prescribed amount.

2. The method of claim 1 further including the step of adjusting the effective moment of force on the weighted member by its weights such that birds weighing less than a predetermined amount will not pivot the weighted member.

3. Apparatus for sizing poultry comprising:

a support frame;

a weighted beam pivotally mounted on said frame;

a weighing platform carried by said beam and movable therewith to pivot said beam;

conveying means for successively moving poultry over said weighing platform so that the weight of the poultry is subjected to said platform to selectively pivot said weighted beam;

ejector means for selectively ejecting the poultry from the conveying means; and control means for causing said ejector means to selectively eject poultry from said conveying means in response to a prescribed movement of said weighted beam, said control means including actuating means for timing the movement of said beam between first and second predetermined positions to cause said ejector means to eject said poultry only when said beam requires longer than a predetermined time interval to move from said first to said second positions.

4. The apparatus of claim 3 further including a weight adjustably positionable along said beam to require a predetermined minimum weight of the poultry to pivot said beam.

5. The apparatus of claim 3 wherein said control means includes a light source and a photoelectric sensing device carried by said support frame in a spaced apart relationship so that light from said light source will actuate said photoelectric sensing device, and a scan plate carried by said beam to extend into the space between said light source and said photoelectric sensing device to selectively block the light from exposing said sensing device, said scan plate defining a narrow slot therein oriented substantially perpendicular to the path of movement of said scan plate to selectively admit light to said photoelectric sensing device to actuate same as said slot moves across said sensing device during movement of said beam.

6. The apparatus of claim 5 wherein said control means further includes delay means connecting said photoelectric sensing device to said ejector means for selectively delaying the time between the initial admission of light through said slot to actuate said sensing device and the actuation of said ejector means to eject poultry from said conveying means.

7. The apparatus of claim 6 wherein said delay means is selectively adjustable to substantially equate the delay time between the initial admission of light to said sensing device and the actuation of said ejector means to that required for said scan plate to move with said scale beam to block the light after said slot has crossed said sensing device when the weight of said poultry is the maximum allowable weight for the desired weight range.

8. The apparatus of claim 7 wherein said control means includes a power supply connected in series with a silicon control rectifier which conducts in response to light exposure of said photoelectric sensing device, wherein said delay means includes a variable RC circuit connected in parallel across said series circuit so that a voltage is imposed across said RC circuit when said rectifier is conducting and having a voltage output therefrom, said control means further including a unijunction transistor connected to said series circuit and having its gate connected to the voltage output of said RC circuit to cause said transistor to conduct when the voltage output from said RC circuit reaches a predetermined level, and the output from said transistor connected to said ejector means to actuate same when said transistor conducts.

9. The apparatus of claim 8 wherein said RC circuit includes potentiometer means for selectively varying the time for said output from said RC circuit to reach said predetermined voltage level to cause said transistor to conduct.

10. The apparatus of claim 9 further including a weight adjustability positionable along said beam to require a predetermined minimum weight of the poultry to pivot said beam.

* * * * *